(12) United States Patent
Stribling et al.

(10) Patent No.: US 8,816,187 B1
(45) Date of Patent: Aug. 26, 2014

(54) STOWING OR DEPLOYING A SOLAR ARRAY

(75) Inventors: Ray A. Stribling, Redondo Beach, CA (US); Darren S. Cokin, Santa Monica, CA (US); Andrew R. Streett, San Clemente, CA (US)

(73) Assignee: The Boeing Company, Chicago, IL (US)

( * ) Notice: Subject to any disclaimer, the term of this patent is extended or adjusted under 35 U.S.C. 154(b) by 649 days.

(21) Appl. No.: 13/088,922

(22) Filed: Apr. 18, 2011

(51) Int. Cl.
*H01L 31/045* (2006.01)

(52) U.S. Cl.
USPC ......... 136/245; 244/172.7; 126/570; 136/244

(58) Field of Classification Search
USPC ................. 136/244, 245; 244/172.7; 126/570
See application file for complete search history.

(56) References Cited

U.S. PATENT DOCUMENTS

| | | | |
|---|---|---|---|
| 3,690,080 A | 9/1972 | Dillard | |
| 4,015,653 A | 4/1977 | Slysh et al. | |
| 5,961,738 A * | 10/1999 | Benton et al. | 136/245 |
| 6,031,178 A | 2/2000 | Kester | |
| 6,423,895 B1 * | 7/2002 | Murphy et al. | 136/245 |
| 6,637,702 B1 | 10/2003 | McCandless | |
| 6,983,914 B2 | 1/2006 | Stribling et al. | |
| 7,806,370 B2 | 10/2010 | Beidleman et al. | |

* cited by examiner

*Primary Examiner* — Jonathan Johnson
*Assistant Examiner* — Christina Chern
(74) *Attorney, Agent, or Firm* — Hope Baldauff, LLC (57) ABSTRACT

This disclosure is directed to apparatuses, systems, and methods associated with the stowing, deploying, and deployment of a solar cell array. With reference to some exemplary embodiments this disclosure teaches apparatuses, systems, and methods directed to a solar cell array system that is a relatively lightweight, compact, and self-contained structure that securely stores, protects, and deploys the solar array. With reference to some exemplary embodiments this disclosure teaches apparatuses, systems, and methods for deploying a solar cell array that is held in the deployed configuration by self-contained compressive force and tensile force members such that no loads are carried through the solar cell panels.

6 Claims, 7 Drawing Sheets

STOWING OR DEPLOYING A SOLAR ARRAY

STATEMENT REGARDING FEDERALLY SPONSORED RESEARCH OR DEVELOPMENT

The U.S. Government has a license in this invention as provided by the terms of Agreement No. FA9453-10-2-0102 awarded by the U.S. Air Force.

BACKGROUND

Solar cell arrays are often used as a power source for spacecraft, such as satellites orbiting the earth. A typical satellite orbiting the earth has a spacecraft platform from which is attached or otherwise extends one or more solar cell arrays. A solar cell array is typically formed by a number of solar cell panels coupled to each other in some configuration and supported by a structure.

In an effort to make solar cell arrays more compact to stow and less cumbersome to deploy beyond the earth's atmosphere, solar cell panels may be manufactured using a flexible substrate. Various flexible solar cell panels are known, such as those fabricated from a fiberglass, carbon composite, or thin polymeric substrate, upon which are bonded thinned crystalline solar cells, or from thin metallic foils upon which are fabricated amorphous silicon solar cells. Examples of flexible solar panels include thin-film photovoltaics manufactured by ITN Energy Systems, Inc. of Littleton, Colo., UNI-SOLAR® modules manufactured by United Solar Ovonic, L.L.C. of Auburn Hills, Mich., and FRUSA (Flexible Rolled Up Solar Array) assemblies with crystalline solar cells manufactured by Applicant, The Boeing Company of Chicago, Ill.

Various apparatus and methods of stowing and deploying solar cell arrays have been attempted. For example, solar panels can be individually supported by pivotally connected beams that nest within each other in the stowed position and that extend to form a solar array. Another method of stowing and deploying a solar cell array includes the use of slit-tube longerons and flat sheets stowed as a rolled structure, and allowing the rolled structure to deploy by unrolling in response to heat from the sun. Still another method of stowing and deploying a solar array includes providing a mechanism for deploying and retracting a plurality of hinged isogrid panels having solar cells supported by individual base structures, stowed in a folded stack and arranged for automatic deployment into a long continuous strip or array.

Improvements to the present state of solar cell array technology are desirable. Particularly desirable are improvements to the present state of flexible solar cell array technology used with spacecraft, including the stowing, deploying, and deployment of a solar cell array attached to a spacecraft in orbit around a planetary body or otherwise located beyond the earth's atmosphere.

SUMMARY

One embodiment of the present disclosure is a solar cell array system having a housing structure or valance configured to stow and deploy a solar cell array, a restraint mechanism that is positioned substantially within the housing structure, and a solar cell array positioned within the housing structure that is supported by the restraint mechanism and anchored at one end within the housing structure. This embodiment further includes an end wall or end beam that is releasably mated to the housing structure and releasably attached to the restraint system, and to which the opposite end of the solar cell array is anchored. This embodiment of the solar cell array system also includes at least one compression member, which is shown as a roll-up beam assembly in the form of a bow spring. The bow spring is attached to the housing structure and is configured to extend to and engage the end wall. As the bow spring extends it pushes the end wall from the housing structure to draw the solar cell array from within the housing structure. This embodiment of the solar cell array system also may include at least one tensile force member that carries a tensile load, which is shown as a tether connected to and extending between the housing structure and the end beam.

Another embodiment of the present disclosure includes a system for supporting a solar panel, which teaches a first load bearing edge and a second load bearing edge, both having a first end and a second end. Further, the load bearing edges may be constructed of a number of end flanges attached via hinges. The first ends of each load bearing edge are attached to a first support and the second ends of each load bearing edge are attached to a second support. At least one solar panel is attached at a first end to the first load bearing edge and attached at a second end to the second load bearing edge. In this configuration the solar panel is simply supported at opposite ends by load bearing edges.

Still another embodiment of the present disclosure provides a method for deploying a solar cell array. The operations of one method, which are not limited to the following sequence presented here for the purpose of teaching and not limitation, includes positioning a solar cell array system to be deployed. The solar cell array system may have a first support that is releasably secured to a second support. The first support is detached from the second support and a compressive force member, which is connected to both the first and second supports, is extended to push the first support away from the second support. Additional operations include pulling a solar cell array from the second support with the first support. The solar cell array may have a first load bearing edge attached at a first end to the first support and attached at a second end to the second support. The solar cell array system may also have a second load bearing edge which is attached at a first end to the first support and attached at a second end to the second support. Additional operations include supporting at least one solar cell panel from a first end attached to the first load bearing edge and from a second end attached to the second load bearing edge; and, extending the first support a distance from the second support to define an end point position of the deployed solar cell array.

The features, functions, and advantages that have been discussed herein can be achieved independently in various embodiments of the present disclosure or may be combined in yet other embodiments, further details of which can be seen with reference to the following description and drawings.

DETAILED DESCRIPTION

Figure 1:
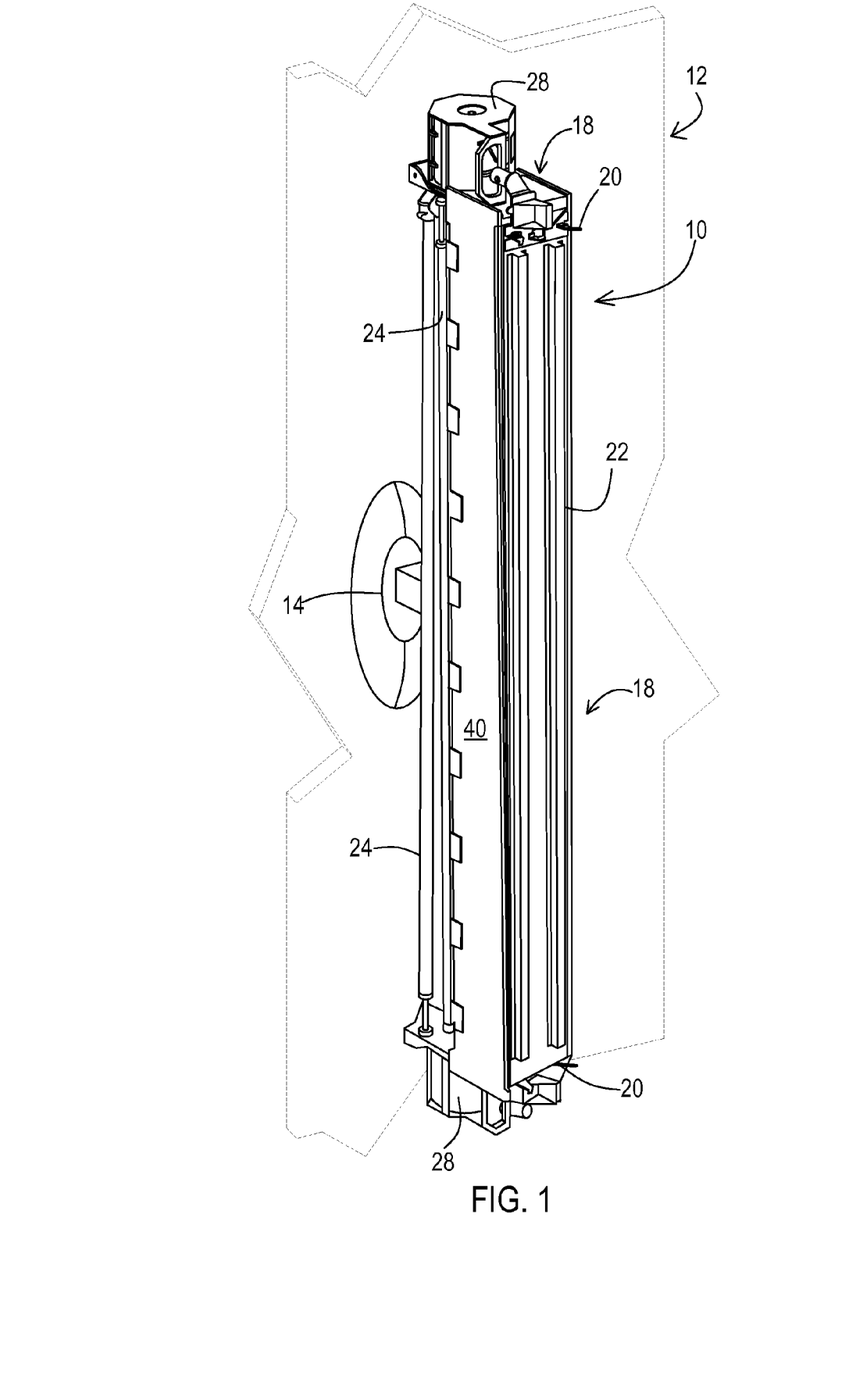
FIG. 1 illustrates an exemplary solar cell array system in the stowed configuration.
Figure 2:
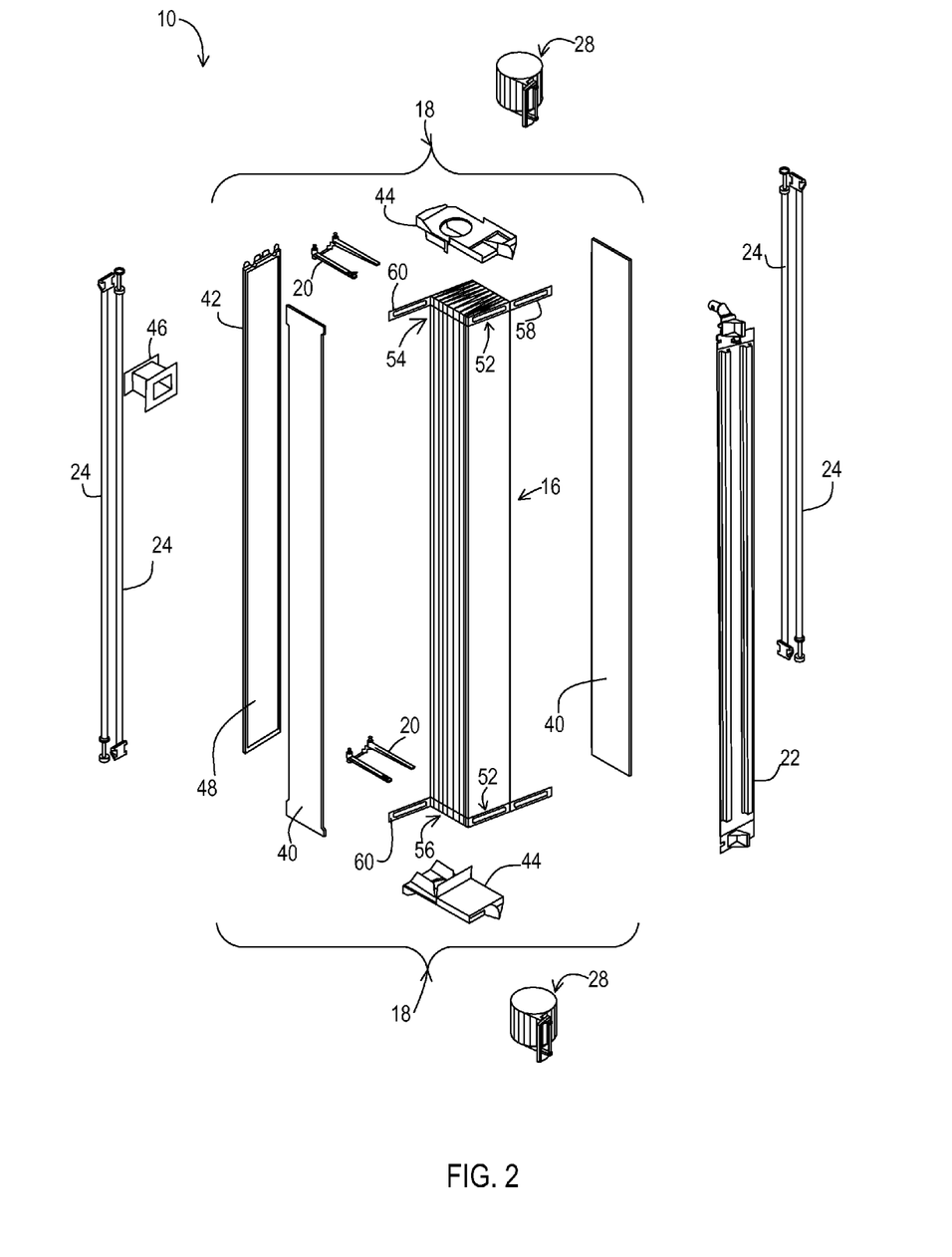
FIG. 2 is an exploded view of the solar cell array system of FIG. 1.
Figure 3:
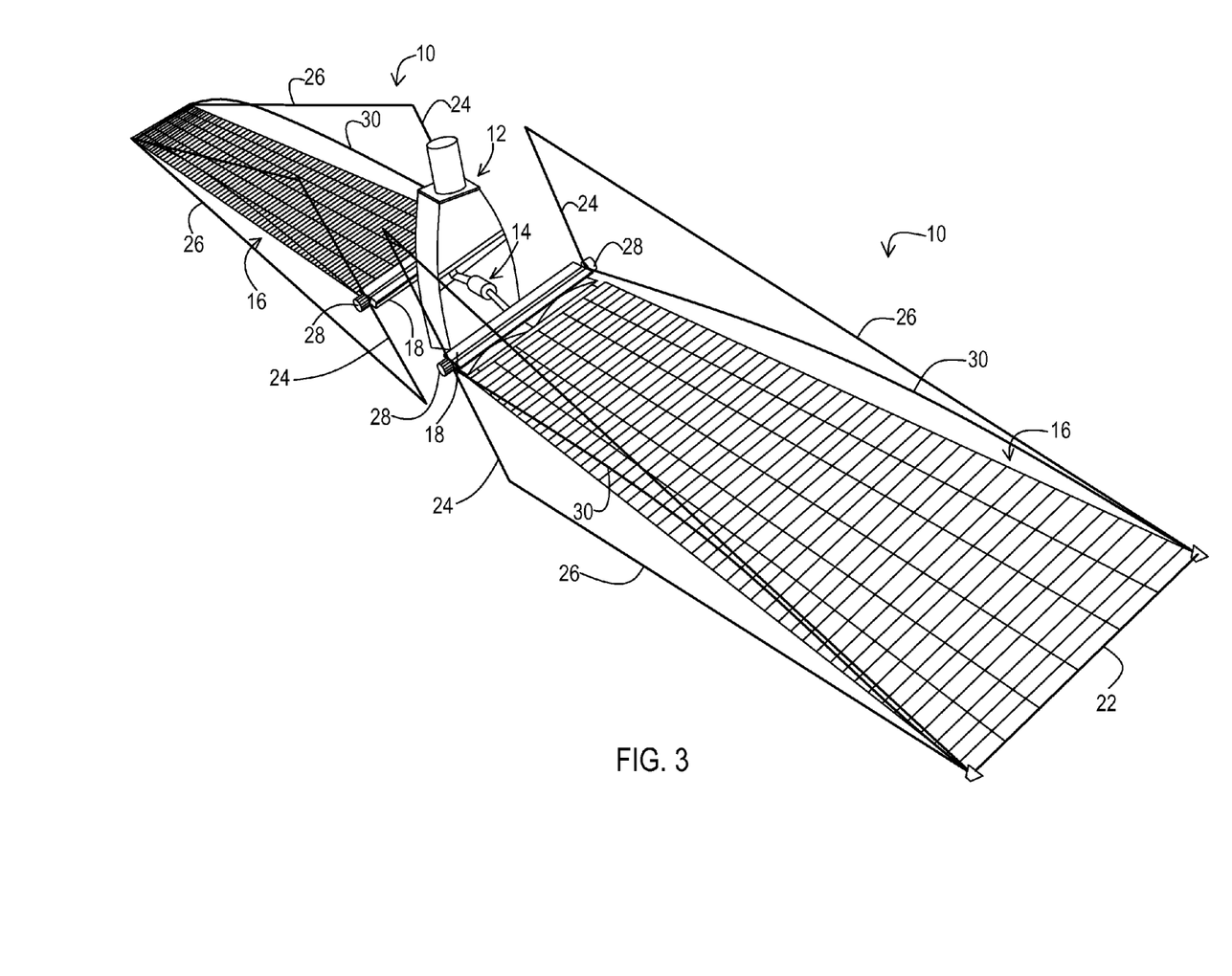
FIG. 3 illustrates an exemplary solar cell array system in the deployed configuration.

Turning simultaneously but briefly to FIGS. 1, 2, and 3, there is illustrated an exemplary solar cell array system 10 attached to a spacecraft 12 via a coupling assembly 14. By way of general overview, FIG. 1 shows an example of the solar cell array system 10 as it may be positioned in the stowed configuration and before deploying a folded solar cell array 16; FIG. 2 shows an exploded view of the solar cell array system 10 of FIG. 1; and, FIG. 3 illustrates an exemplary pair of solar cell array systems 10 as each may deploy a solar cell array 16.

As best shown in FIGS. 1 and 2, the illustrated solar cell array system 10 comprises a housing structure in the form of a valance 18, shown here as an assembly of panels and plates described in detail below. The valance 18 houses at least one restraint mechanism, shown here as at least one set of opposing restraint rails 20, from which the folded solar cell array 16 is supported while stowed. Releasably attached to the valance 18 is an end wall, shown here in the form of an end beam 22. Also associated with the illustrated solar cell array system 10 and described in further detail below are two sets of tether beams 24, one set on each side of the valance 18 together with respective tethers 26, and two roll-up beam assemblies (RUBA) 28 which house and push out respective bow springs 30 (best shown in FIG. 3).

The illustrated valance 18 includes two side panels 40, a back panel 42, and two end plates 44. The back panel 42 may include a yoke 46 on the exterior side which connects the solar cell array system 10 to the coupling assembly 14, and a foam panel 48 on the interior side facing the folded solar cell array 16. By way of example and not limitation, the side panels 40 and back panel 42 of the illustrated valance 18 may be constructed of ⅜" or ½" core honeycomb panel laminated on both sides with graphite facesheets approximately 0.010" thick, the two end plates 44 may be constructed of machined aluminum, and these elements are connected together. The valance 18 is a housing or support structure in that it includes the structure to attach and support the restraint rails 20; the structure to anchor, stow, and house the folded solar cell array 16; and, the structure to attach and support elements such as the tether beams 24 and the RUBA's 28. The end beam 22 is matingly engaged to the housing structure or valance 18 and is likewise a support structure in that it includes the structure to releasably attach and support the restraint rails 20; the structure to cover and protect the folded solar cell array 16; and the structure to anchor and support the solar cell array 16 while deploying and while deployed.

Features of the end beam 22 include the structure to further secure the folded solar cell array 16 within the valance 18; a connection to the folded solar cell array 16; at least one fitting configured to releasably mount the end beam 22 to the restraint rails 20; and the structure to attach the tethers 26 and bow springs 30. In this way and in some embodiments the end beam 22 is a support structure. By way of example and not limitation, the illustrated end beam 22 may be constructed of ⅜" core honeycomb panel laminated on both sides with graphite facesheets approximately 0.010" thick and a foam panel 48 on the interior side facing the folded solar cell array 16. The end beam 22 may include enhancements, such as stiffeners, stabilizers, foils, combinations thereof, and the like.

In various embodiments the end beam 22, side panels 40, back panel 42, and end plates 44 are constructed of other materials or composites including alloy steel, graphite, titanium, carbon composite fibers, polymers, combinations thereof, and the like. In addition, the foam panels 48 are constructed of materials or composites including polyimide, silicone, combinations thereof, and the like. In various embodiments the elements of the valance 18 are assembled with attachment devices including clips, fasteners, welds, rivets, hinges, chemical compounds and bonding agents, combinations thereof, and the like. In other embodiments, various elements of the valance 18 may be formed together, such as the equivalent of the side panels 40 and back panel 42 begin formed from a single panel of material.

Alternative embodiments include other configurations of panels, end walls, plates, enclosures, supports, combinations thereof, and the like that are configured to separate and draw out the solar cell array 16. Further, in the illustrated embodiments a compression member or compressive force member that carries a compressive load or exerts a compressive force is shown as a bow spring 30, which is configured to push out an end wall that is attached to a solar cell array 16. Still other embodiments include alternative structures configured to extend outwardly to draw out a solar cell array 16 and to provide a compressive load or compressive force, such as telescopic rods, extension beams, combinations thereof, and the like. In addition, the illustrated embodiments show tensile force members in the form of tethers 26, that are in tension or carry a tensile load when the solar cell array 16 is fully deployed. Alternative embodiments may not include tethers 26 as the tensile force member, as tensile force or loads may be carried by other elements such as those comprising the load bearing edges 54, 56 of the solar cell array 16.

In the stowed configuration, after the folded solar cell array 16 is positioned within the valance 18 and mounted to the restraint rails 20, the end beam 22 is positioned over and attached to the solar cell array 16, and releasably engaged to the free end of both sets of restraint rails 20. In this stowed configuration the end beam 22 forms a releasable end-wall to the valance 18, which together encloses the folded solar cell array 16. Advantages of the illustrated solar cell array system 10 as stowed include a relatively lightweight, compact, and self-contained structure that securely stores and protects the cell modules that comprise the solar cell array 16, diminishes thermal distortion, and is ready for deployment.

The structure shown in FIG. 3 shows two exemplary solar cell arrays 16 as they may be deployed. Alternative embodiments may include fewer or more solar cell array systems 10 attached to a spacecraft 12. With an eye toward FIG. 1 as reference is made primary to FIG. 3, in deploying a solar cell array 16 from the illustrated solar cell array system 10 the end beam 22 is disengaged from the restraint mechanism 20 and each RUBA 28 commences pushing out its respective bow spring 30. As understood by those skilled in the art, in some embodiments the RUBA 28 houses a substantially flat thin metal sheet stored on a spool which, as the thin metal sheet is unwound from the spool, is rolled or coiled in a tubular fashion to form the bow spring 30. In alternative embodiments the thin sheet stored on a spool is any material with an elastic memory that elastically distorts from flat to round, including carbon fiber, alloy steel, combinations thereof, and the like. The leading end of each bow spring 30 is coupled to a respective end of the end beam 22.

As each RUBA 28 commences pushing out its respective bow spring 30, the respective tether beams 24 are deployed. The illustrated tether beams 24 are pivotably attached to the valance 18. As the illustrated tether beams 24 are deployed, each pivotable end of each tether beam 24 rotates to arc its free end outwardly (with respect to the valance 18) until each tether beam 24 extends substantially perpendicular to the valance 18. Each tether beam 24 then latches into a substantially aligned and collinear position with respect to the adjacent tether beam 24. In alternative embodiments, the tether beams 24 are extended and locked into any number of positions of various degrees and orientations, with respect to the valance 18. Tethers 26, each with its leading edge attached to the same end of the end beam 22 and extending from a respective tether beam 24, are pulled from passive spools. In some alternative embodiments there are less than four tether beam 24. In still other alternative embodiments there are no tether beams 24 as the load bearing edges 54, 56 define the end point of the extended solar cell array 16 and carry the tensile loads.

As each bow spring 30 extends from its respective RUBA 28 each bow spring 30 pushes the end beam 22 outwardly and away, with respect to the valance 18. As the end beam 22 is pushed outwardly it pulls the solar cell array 16 from its stowed position in the valance 18. The bow springs 30 continue to push the end beam 22 away from the spacecraft 12 and the solar cell array 16 continues to unfold until the tethers 26 become taut. Taut tethers 26 may define the end point of the extended solar cell array 16, and the bow springs 30 may continue to deploy until a desired arc is achieved.

In this way the bow springs 30 are a compression member or compressive force member that exerts a compressive force or carries a compressive load, while the tethers 26 are a tension member or tensile force member that exerts a tensile force or carries a tensile load. Together, the compressive and tensile forces maintain the deployed solar cell array 16 in relative equilibrium.

Figure 4:
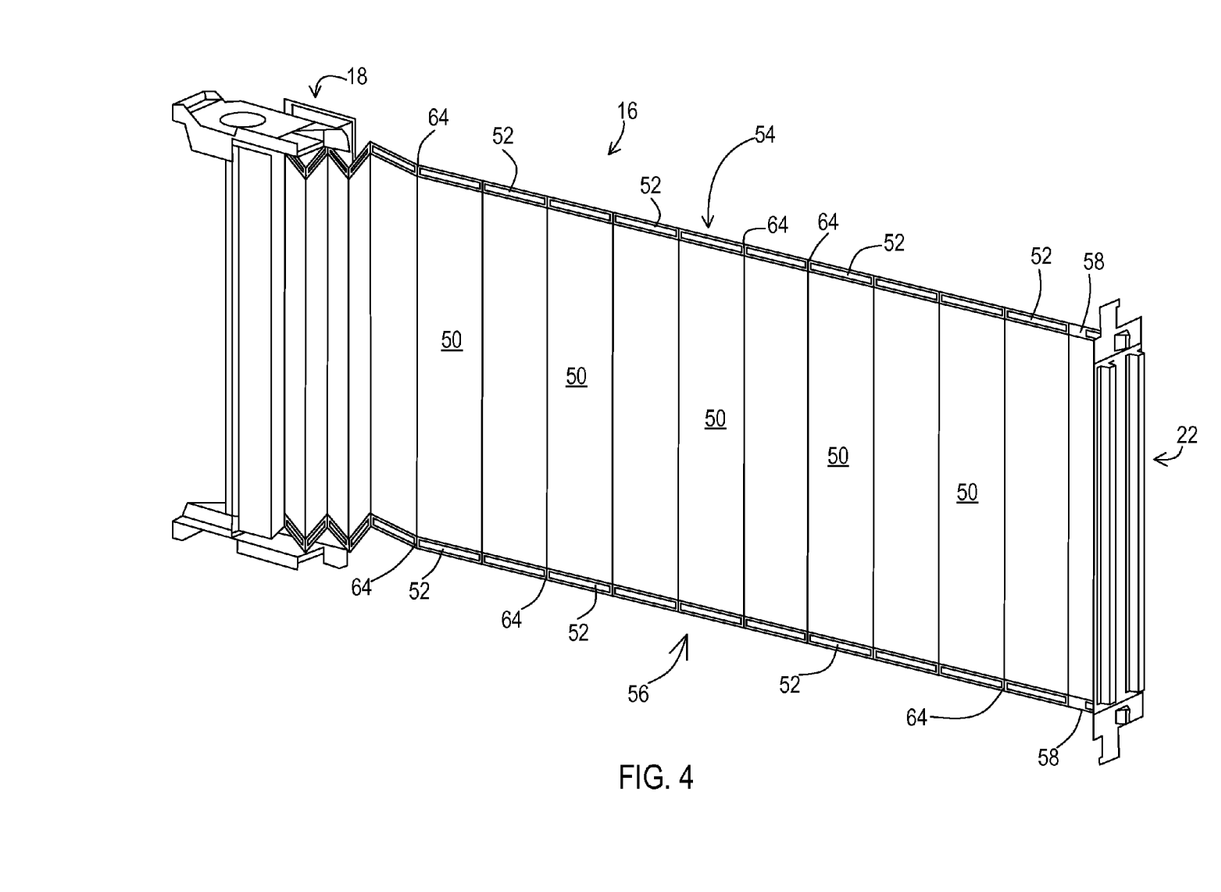
FIG. 4 shows a solar cell array in the deploying configuration.

FIG. 4 shows a solar cell array system 10 as it may appear while partially deploying. For clarity and purposes of the present teaching only some elements of the solar cell array system 10 are shown, namely, a portion of the valance 18, a partially unfolded solar cell array 16, and the end beam 22. The illustrated solar cell array 16 may include any type and number of solar panels 50. Each solar panel 50 may be flexible and include any number of solar cells. Flexible solar panels are well known in the art and will not be described here in detailed. Any rollable, foldable, or flexible solar panel is contemplated and may be used. By way of illustration and not limitation, examples of such solar panels include thin-film photovoltaic blankets and integrated blanket/interconnect systems. In alternative embodiments a semi-rigid or rigid solar cell panel may be used.

In the illustrated solar cell array system 10 each solar panel 50 is approximately seven inches (7") wide and approximately ninety-eight inches (98") in length, and each solar panel is hingedly connected to an adjacent solar panel 50. In one embodiment, the solar cell array 16 comprises one hundred and twenty-five (125) hingedly attached solar panels 50, which when folded together in accordion fashion and stowed within the valance 18 is approximately six and one-half inches (6½") thick. In alternative embodiments, solar panels 50 of different widths and lengths are contemplated, as well as the number of panels that may comprise a solar cell array 16. Some embodiments also include elements that provide for vibration dampening, acoustic dampening, and heat dissipation, such as a plurality of polyimide foam cushions on the back or shady side of the solar array 16. In one embodiment, two silicone foam strips are positioned and affixed across the back or shady side of each solar cell in a staggered configuration, such that when the solar array 16 is folded and stowed, the face or sunny side of a solar panel 50 is orientated toward the same side of a first adjacent solar panel 50, and the back or shady side of the same solar panel 50 is orientated toward the same side of a second adjacent solar panel 50, so that each solar cell is supported across the back or shady side by four silicon foam strips.

Each end of each solar panel 50 is attached to and supported by an engaging structure in the form of an end flange 52 having an aperture, and each end flange 52 is hingedly connected to an adjacent end flange 52. In the stowed configuration the folded solar cell array 16 is positioned within the valance 18, and engaged and supported at the top by an upper set of restraint rails 20 inserted through a first plurality of end flanges 52 with apertures, and engaged and supported at the bottom by a lower set of restraint rails 20 inserted through a second plurality of end flanges 52 with apertures. The aperture of each end flange 52 is sized to engaged and releasably disengage from the respective restraint rail 20. In the context of the present disclosure and for the purposes of teaching and description, words are used that merely reference direction or orientation, such as "upper", "lower", "top", "bottom", "front", "back", "pulled", "pushed", and the like, and any of their derivatives, and none are used in any sense that limits or restricts.

In the stowed, deployed, and deploying configurations, one series of hingedly connected end flanges 52 forms a first load bearing edge 54 and another series of hingedly connected end flanges 52 forms a second load bearing edge 56, spaced apart from the first load bearing edge 54. In the illustrated embodiment the bearing edges 54, 56 are substantially parallel, in other embodiments the first load bearing edge 54 and second load bearing edge 56 are spaced apart but not substantially parallel.

In the illustrated embodiment the end flanges 52 are approximately eight inches (8") in length and constructed of NOMEX® brand material. Each end flange 52 is hingedly connected to an adjacent end flange 52 by a flexible flange hinge 64 in the form of an upper and lower strap spanning adjacent ends of adjacent end flanges 52 and fused together to form a strap hinge. To both faces of the series of hingedly connected end flanges 52, that is, to both the front and back of both load bearing edges 54, 56, is applied a length of high temperature polyimide film such as KAPTON® brand polyimide tape. Assembled, the load bearing edges 54, 56 are each approximately 0.050" thick.

In the illustrated embodiments, each end flange 52 is comprised of a pair of mirrored flanks that, when mated, forms an end flange 52 that is substantially the same width as the solar panel 50 the end flange 52 supports. Further, each mirrored flank includes a structure for attaching a solar panel 50. In the illustrated embodiments each mirrored flank includes a panel attachment flap (not shown) that attaches to a respective side of each solar panel 50 and, when mated to form an end flange 52, captures and fastens the solar panel 50 to the end flange 52.

Alternative embodiments of the elements forming the load bearing edges 54, 56 are contemplated, including alternative designs that are constructed of alternative materials. By way of illustration and not limitation, the end flanges 52 may take any shape and have any sized aperture that can be positioned within the valance 18 and mounted to a restraint rail 20. In alternative embodiments, where the releasing mechanism is not a restraint rail 20 but a different structure for indexing or metering the release of each solar panel 50, the end flanges 52 may not include an aperture but may include a different engaging structure for releasably attaching to a restraint mechanism. For example, alternative restraint mechanisms may include tabs, pins, belt drives, gears, combinations thereof, and the like, which matingly disengage an element associated with an engaging structure such as end flange or a portion of an end flange, as the solar cell array 16 unfolds from the valance 18.

Likewise, connectors of various designs to attach adjacent end flanges 52 may be used, including butt hinges, loops, soss hinges, clips, knife hinges, couplings, butterfly hinges, "H" hinges, combinations thereof, and the like. In other alternative embodiments, enhanced polymers of various designs may be used, including temperature resistant or flame retardant products presently sold under various brand names including ITWFORMEX®, VALOX®, and DUROID®, or distributed by companies such as E.I du Pont de Nemours and Company, and The Gund Company of St. Louis, Mo. Similarly, panel attachments of various designs to attach a solar panel 50 to an end flange 52 may be used, including mechanical fasteners known to those skilled in the art, chemical bonding known to those skilled in the art, non-conductive adhesive for mechanical attachment, conductive adhesive for electrical bonding, combinations thereof, and the like.

A leading or first end flange 58 of each load bearing edge 54, 56 is attached or anchored to the end beam 22 and a similar trailing or last end flange 60 (best shown in FIG. 2) is attached or anchored to the valance 18 or related structure. Advantages provided by the load bearing edges 54, 56 include operatively attaching the end beam 22 to the valance 18, supporting each solar panel 50, and carrying the loads and transferring the forces associated with the storing, deploying, and deployment of the solar cell array 16. Such loads and forces include tension, tensile forces, and tensile loads. Additional benefits of attaching the solar panels 50 to opposing pairs of end flanges 52 include improved methods of preventing the solar panels 50 from curling, simply supporting each solar panel 50 from opposite ends, simply supporting the deployed solar array 16 from its four corners, and eliminating electrical jumpers from load bearing surfaces.

Figure 5:
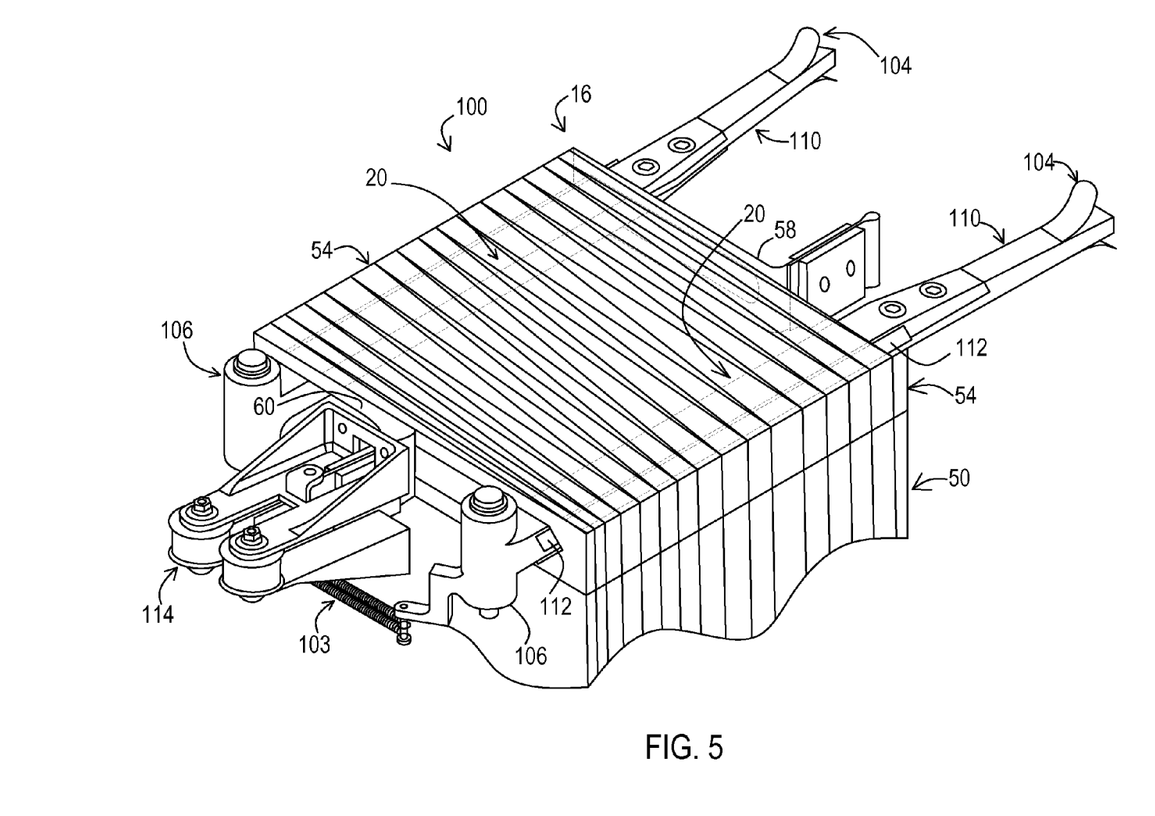
FIG. 5 is a partial view of a solar cell array in the stowed configuration.

Turning now to FIG. 5 there is shown a partial view of a solar cell array 16, as it would appear folded and stowed within the valance 18, secured by an exemplary panel restraint system 100 according to the present disclosure. The illustrated folded and stowed solar cell array 16 is secured by a pair of opposing panel restraint systems 100 positioned at opposite ends of the valance 18. For the present purposes of teaching and description, and not restriction or limitation, the panel restraint system 100 illustrated in FIG. 5 will be referred to as the top or upper panel restraint system 100, which mirrors the bottom or lower panel restraint system 100 located at the opposite end of the solar panel array 16.

The illustrated panel restraint system 100 comprises a restraint mechanism configured as a pair of spring actuated restraint rails 20 and at least one stepper 104. Here the restraint rails 20 are attached to a rail spring 103, supported at one end by a hinge 106 connected to the valance 18 and at the opposite end by the end beam 22, when the end beam 22 is mounted to the end beam interface 110 portion of the restraint rails 20 and mated the valance 18. In this configuration, the restraint rails 20 are prevented from pivoting, and act as supported beams that carry the load of the solar panels 50 to the valance 18 and end beam 22.

When the end beam 22 is disengaged and pulled away by the bow springs 30 as described above, the end beam interface portion 110 is disengaged. In this configuration, the restraint rails 20 are now both cantilevered from the hinge 106, the load of the solar panels 50 is carried by the restraint rails 20 and transferred to the valance 18, and the restraint rails 20 can pivot and meter the deploying of the solar panels 50 from the stowed position. Advantages of the restraint rails 20 include supporting the weight of the solar panels 50 while stowed and guiding the solar panels 50 as the solar array 16 is deploying. Advantages of the rail spring 103 include biasing the restraint rails 20 apart from each other. In the illustrated embodiment the rail spring 103 is shown as an extension spring; in alternative embodiments the rail spring 103 is an individual torsion spring for each restraint rail 20.

Here the steppers 104 are configured as leaf springs mounted at the free end of each restraint rail 20. Functions of the steppers 104 include creating resistance to the panel segment egress to prevent uncontrolled deployment of each solar panel 50 of the solar array 16. That is, the steppers 104 prevent the solar panels 50 from deploying out of the valance 18 any faster than they are being pulled out by the moving end beam 22, attached to the solar cell array 16 via the leading or first end flange 58. Alternative embodiments of the steppers 104 are contemplated, including springs and spring loaded features, including lobes, detents, stops, combinations thereof, and the like that meter and control the egress of the solar panels 50 from the valance 18.

Additional features of the illustrated restraint rails 20 include tapered edges where the end flanges 52 engage, to which compliance strips or cushions 112 may be attached. Here, the cushions 112 are constructed of materials or composites including a base of polyimide, silicone, combinations thereof, and the like. Advantages of the tapered edges and cushions 112 include compensating for manufacturing tolerances between the end flanges 52 and restraint rails 20. In some embodiments the ends of the restraint rails 20 are tapered and matingly engage tapered slots in the end beam 22 during the stowed condition. In alternative embodiments, various configurations that interface and permit for releasably engaging the restraint rails 20 to the end beam 22 are contemplated, including tongue and groove.

Here also is shown a panel tensioner 114, configured as a pair of stainless steel constant force springs mounted in a back-to-back fashion, such as a NEG'ATOR brand constant force spring. Functions of the panel tensioner 114 include providing consistent tension to the solar cell array 16, attached via the trailing or last end flange 60, which in the illustrated assembly is approximately 2.5 lbf per assembly.

Figure 6:
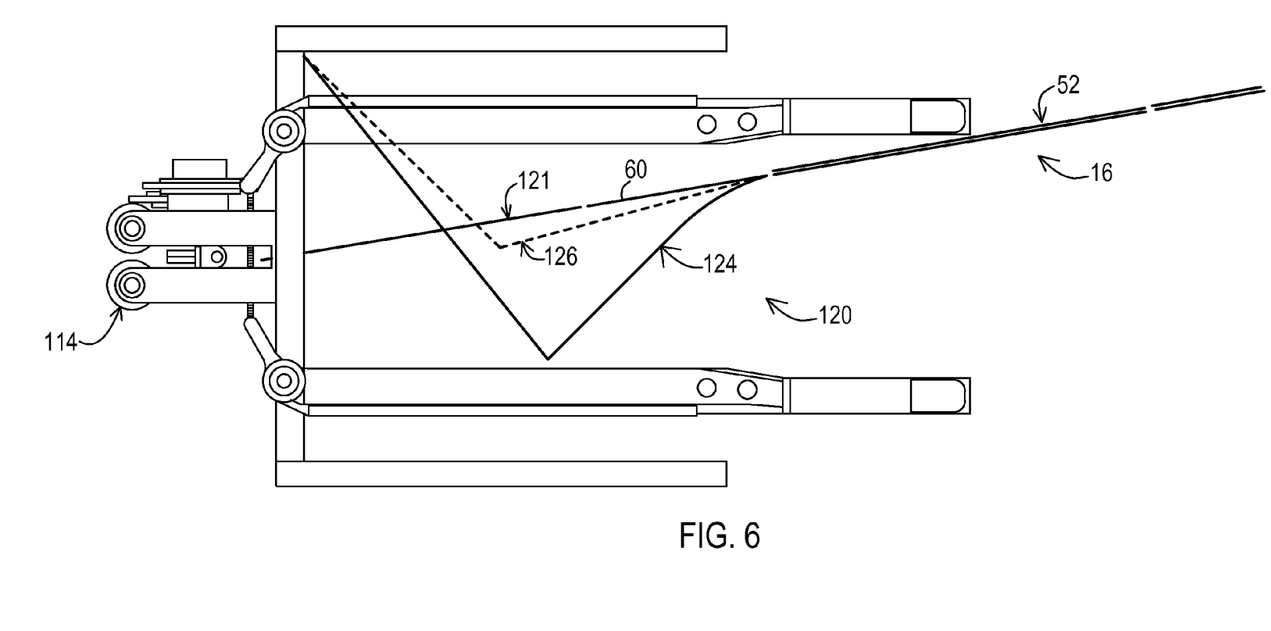
FIG. 6 illustrates a panel restraint and tensioning system.

In some embodiments of the panel restraint system 100 the solar cell array 16 is attached to the valance 18 by connecting the trailing or last end flange 60 to a secure connection point, such as a panel 40, 42 or end plate 44. FIG. 6 shows an embodiment of the panel restraint system 100, namely, a flex harness 120 that is configured to accommodate changes in the length of the solar cell array 16. Here the trailing or last end flange 60 is connected to a leader 121 of the panel tensioners 114. When the tethers 26 expand or contract or the solar panels 50 expand or contract, typically due to environmental changes, the constant force spring 114 will draw the flex harness 120 inwardly and outwardly to compensate for dimensional changes, as shown in a first inward position 124 and a second outward position 126.

Figure 7:
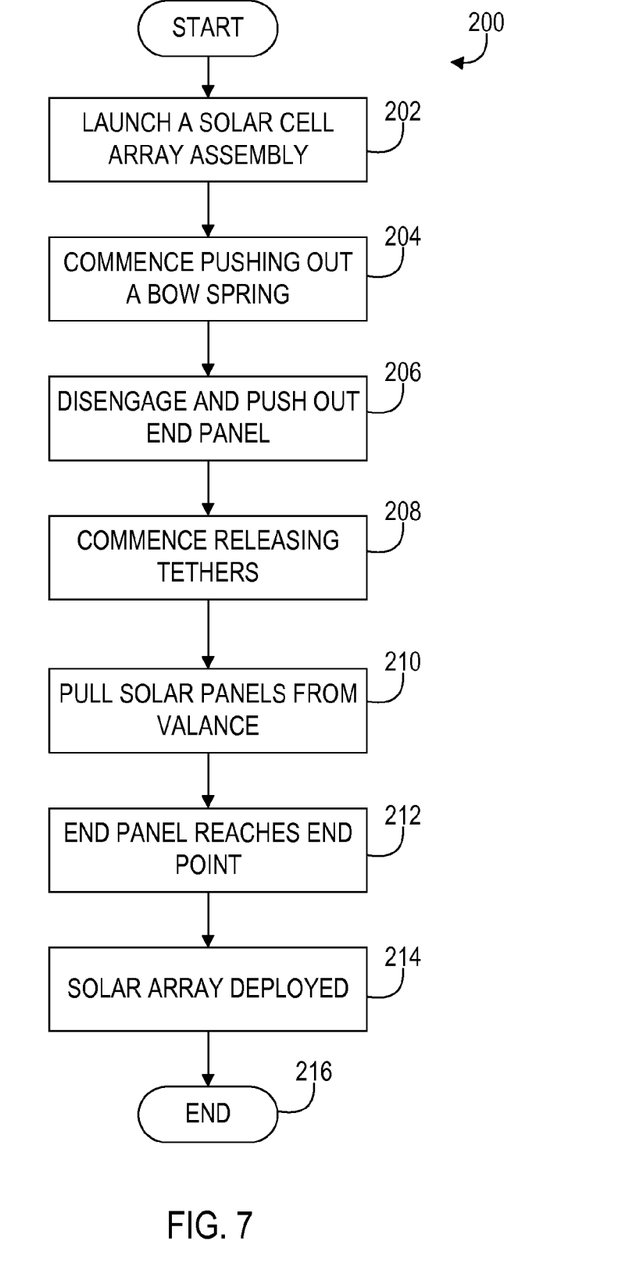
FIG. 7 illustrates a flow chart directed to an exemplary method of deploying a solar cell array system.

Turning now to FIG. 7, an illustrative routine 200 for the deploying of the solar array 16 will now be described. It should be appreciated that more or fewer operations may be performed than shown in FIG. 7 and described herein. Moreover, these operations may also be performed in a different order than the order described herein.

The routine 200 begins at operation 202, with the launch of a solar cell array system 10 from a vehicle such as but not limited to an airplane, rocket, or spacecraft. In the illustrated embodiments the solar cell array system 10 is attached to a spacecraft 12, launched, and deployed beyond the earth's atmosphere.

The routine 200 continues from operation 202 to operation 204, where once the spacecraft 12 is in suitable position both the upper and lower RUBA 28 commence pushing out its respective bow spring 30. The leading end of each bow spring 30 is coupled to a bow spring adapter positioned on a respective end of the end beam 22. The routine 200 continues from operation 204 to operation 206, where each bow spring 30 has extended sufficiently to disengage the end beam 22 from the restraint rails 20.

The routine 200 continues from operation 206 to operation 208, where at substantially the same time as each RUBA 28 commences pushing out its respective bow spring 30, the tether beams 24 release and rotate outwardly (with respect to the valance 18) until each tether beam 24 extends and latches into final position. Tethers 26, each with its leading edge attached to the end beam 22 and extending from a respective tether beam 24, are then pulled from passive spools as the end beam 22 is pushed out by the bow springs 30.

The routine 200 continues from operation 208 to operation 210, where each bow spring 30 pushes the end beam 22 outwardly. The end beam 22, which is attached to the folded solar array 16 by an upper and lower leading end flange 58, pulls the folded solar cell array 16 from the stowed position in the valance 18. The unfolding of the solar cell array 16 includes pulling each end flange 52 from its respective restraint rails 20. In the illustrated embodiment the restraint rails 20 articulate inwardly as each solar panel 50 deploys and springs back outwardly, thus restraining deployment to one panel at a time. The solar panels 50 are further metered during deploying by steppers 104.

The routine 200 continues from operation 210 to operation 212, where each bow spring 30 continues to push the end beam 22 away from the spacecraft 12, the tethers 26 unspool, and the solar cell array 16 continues to unfold until the tethers 26 become taut. Taut tethers 26 define the end point of the extended solar cell array 16 but the bow springs 30 may continue to deploy until a desired arc of each bow spring 30 is achieved.

The routine 200 continues from operation 212 to operation 214, where the solar array 16 is deployed. In the deployed configuration, the bow springs 30 deliver a compressive force to the end panel 22, which is reacted by a tensile force in the tethers 26 and load bearing edges 54, 56. In the deployed configuration the solar panels 50 are each supported at opposite ends by end flanges 52, which together form load bearing edges 54, 56, with no loads being carried by the solar panels 50. The load bearing edges 54, 56 are attached at one end to a panel restraint system 100 and at the opposite end to the end beam 22. After deployment of the solar cell array 16 at operation 214 the routine ends at operation 216. In some alternative embodiments there are less than four tethers 26. In still other alternative embodiments there are no tethers 26 as the load bearing edges 54, 56 define the end point of the extended solar cell array 16 and carry the tensile loads.

The subject matter described herein is provided by way of illustration only and should not be construed as limiting. Various modifications and changes may be made to the subject matter described herein without following the exemplary embodiments and applications illustrated and described, and without departing from the true spirit and scope of the present disclosure, which is set forth in the following claims.

What is claimed is:

1. A solar cell array system, comprising:
   a housing structure configured to stow a solar cell array;
   a restraint mechanism comprising a first restraint rail and a second restraint rail positioned substantially within the housing structure;
   a solar cell array positioned within the housing structure and anchored at one end, and releasably supported by the the first restraint rail and the second restraint rail, the solar cell array comprising a first load bearing edge and a second load bearing edge, each comprising a plurality of hingedly attached end flanges;
   an end wall connected to the solar cell array, and releasably attached to the housing structure via the restraint mechanism;
   at least one compression member attached at one end to the housing structure and at an opposing end to the end wall, and configured to extend the end wall away from the housing structure to deploy the solar cell array; and,
   at least one tensile force member extending from the housing structure and connected to the end wall.

2. The system of claim 1, further comprising a panel tensioner to which the solar cell array is attached.

3. The system of claim 1, wherein at least one of the first and second load bearing edges further comprises an engaging structure that releasably engages the restraint mechanism.

4. The system of claim 1, further comprising at least one solar cell panel defining a first end and a second end, attached at the first end to an end flange of the first load bearing edge and attached at the second end to an end flange of the second load bearing edge.

5. The system of claim 1, wherein at least one restraint rail further comprises a stepper.

6. The system of claim 1, wherein the hingedly attached end flanges further comprise at least one aperture configured to releasably engage at least one of the first and second restraint rails.

* * * * *